United States Patent
Horiuchi et al.

(10) Patent No.: US 12,283,855 B2
(45) Date of Patent: Apr. 22, 2025

(54) ROTOR OF INTERIOR PERMANENT MAGNET SYNCHRONOUS MOTOR

(71) Applicant: SANYO DENKI CO., LTD., Tokyo (JP)

(72) Inventors: Manabu Horiuchi, Tokyo (JP); Kojiro Kawagishi, Tokyo (JP); Yasushi Misawa, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 228 days.

(21) Appl. No.: 17/991,224

(22) Filed: Nov. 21, 2022

(65) Prior Publication Data

US 2023/0179071 A1 Jun. 8, 2023

(30) Foreign Application Priority Data

Dec. 3, 2021 (JP) ................... 2021-196863

(51) Int. Cl.
*H02K 29/03* (2006.01)
*H02K 1/276* (2022.01)

(52) U.S. Cl.
CPC ............. *H02K 29/03* (2013.01); *H02K 1/276* (2013.01)

(58) Field of Classification Search
CPC ............................... H02K 29/03; H02K 1/276
See application file for complete search history.

(56) References Cited

U.S. PATENT DOCUMENTS

| | | | |
|---|---|---|---|
| 5,801,478 A | 9/1998 | Nashiki | |
| 6,936,945 B2 | 8/2005 | Murakami et al. | |
| 9,705,366 B2 * | 7/2017 | Tanaka | H02K 1/146 |
| 2003/0168924 A1 * | 9/2003 | Murakami | H02K 1/276 |
| | | | 310/156.02 |
| 2013/0271248 A1 * | 10/2013 | Nagata | C22C 38/16 |
| | | | 427/127 |
| 2017/0126087 A1 * | 5/2017 | Soderberg | H02K 1/2792 |
| 2018/0190428 A1 * | 7/2018 | Harris | H01F 41/026 |
| 2021/0296948 A1 * | 9/2021 | Yen | H02K 15/03 |
| 2022/0200408 A1 * | 6/2022 | Takahashi | H02K 11/0141 |
| 2023/0223191 A1 * | 7/2023 | Takeuchi | H01F 7/021 |
| | | | 148/103 |

FOREIGN PATENT DOCUMENTS

| | | |
|---|---|---|
| EP | 1298773 A1 | 4/2003 |
| WO | 2012084031 A2 | 6/2012 |
| WO | WO-2018037529 A1 * 3/2018 | ............. H02K 1/276 |

OTHER PUBLICATIONS

"Permanent Magnet Interpolation Reluctance Motor adopting Multilayer Slit Structure", Energy-saving Technical Report, The Japan Machinery Federation, 2009, pp. 42-45, total 5 pages; English Summary; Cited in Specification.
Extended European Search Report (EESR) issued on Apr. 26, 2023 for the corresponding European Patent Application No. 22205816.6.

* cited by examiner

*Primary Examiner* — Forrest M Phillips
(74) *Attorney, Agent, or Firm* — RANKIN, HILL & CLARK LLP

(57) ABSTRACT

Provided is a rotor of an interior permanent magnet synchronous motor, including a plurality of poles, wherein each of the plurality of poles includes a plurality of magnets, and the plurality of magnets is provided in such a manner that a magnetomotive force resulting from each magnet becomes weaker with increasing distance from a magnet center.

9 Claims, 21 Drawing Sheets

ROTOR OF INTERIOR PERMANENT MAGNET SYNCHRONOUS MOTOR

CROSS-REFERENCE TO RELATED APPLICATION

This application is based on Japanese Patent Application No. 2021-196863 filed with the Japan Patent Office on Dec. 3, 2021, the entire content of which is hereby incorporated by reference.

BACKGROUND

1. Technical Field

The present disclosure relates to a rotor of an interior permanent magnet synchronous motor.

2. Related Art

For example, a rotor of an interior permanent magnet synchronous motor including permanent magnets embedded in slits provided on arcs around the center of a magnetic pole is disclosed in the following document: *Permanent Magnet Interpolation Reluctance Motor with Multilayer Slit Structure*. (2009). Energy-saving Technical Report. The Japan Machinery Federation.

SUMMARY

A rotor of an interior permanent magnet synchronous motor, according to an embodiment of the present disclosure, includes a plurality of poles. Each of the plurality of poles includes a plurality of magnets. The plurality of magnets is provided in such a manner that a magnetomotive force resulting from each magnet becomes weaker with increasing distance from a magnet center.

DETAILED DESCRIPTION

Figure 1:
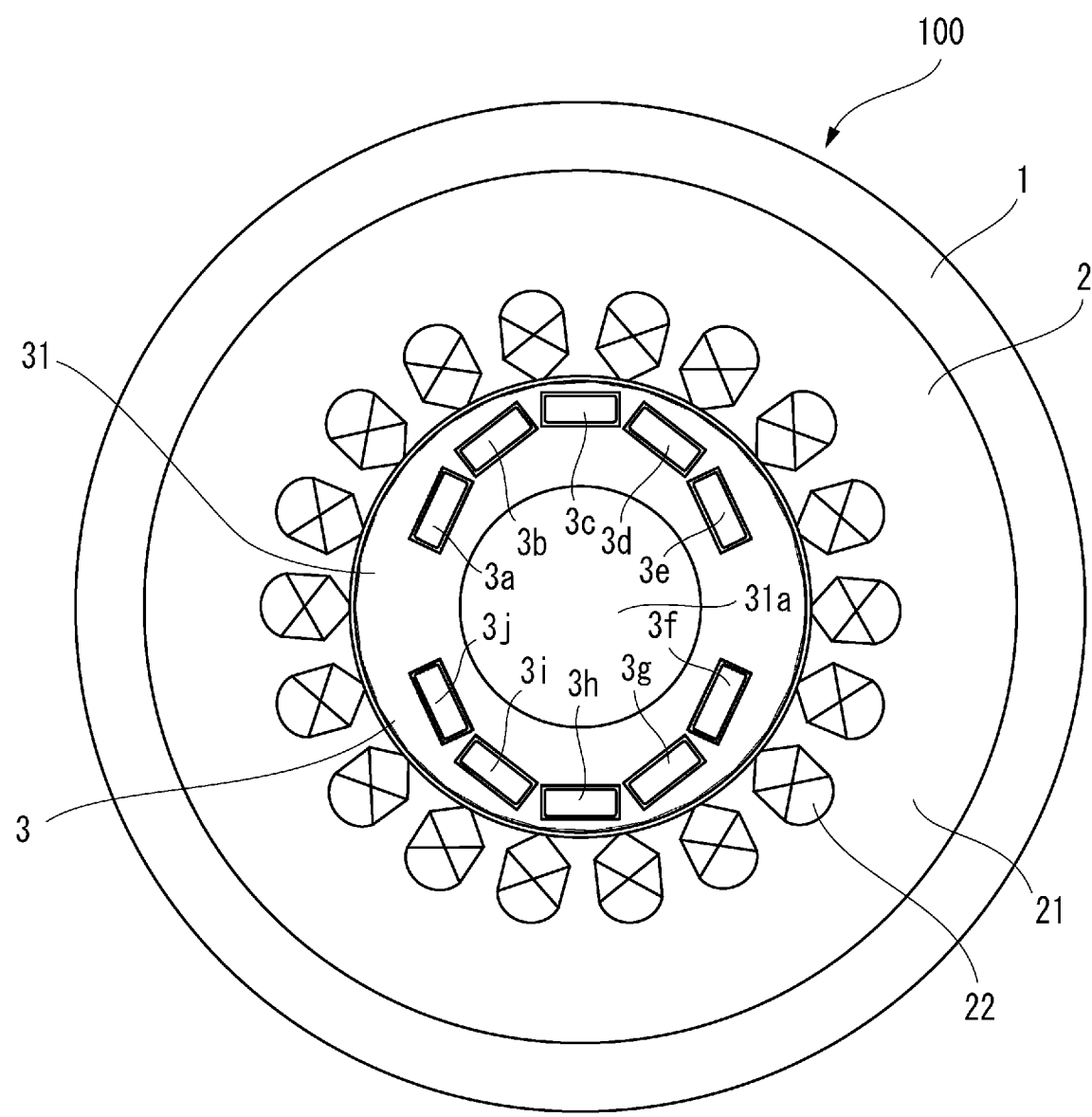
FIG. 1 is a horizontal cross-sectional view of an interior permanent magnet synchronous motor used in a first embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Multilayer slits are placed in the rotor disclosed in the above document. Further, a plurality of permanent magnets is embedded in the rotor. These points have brought about the achievement of size reduction and efficiency improvement of the rotor.

However, the magnetomotive force changes greatly with rotation in an air gap in the rotor disclosed in the above document. Specifically, the magnetomotive force has a tendency to change momentarily from the maximum value to the minimum value with the rotation of the rotor. In other words, the rotor described in the above document has a tendency to cause a change in the magnetomotive force represented as a square wave.

The present researchers have focused on the point that the change in the magnetomotive force represented as a quadrangular waveform such as a square wave includes many harmonic components and on the point that the inclusion of many harmonic components causes large torque ripple. In other words, the researchers thought that a high-performance motor with high efficiency can be realized on the basis of a study of magnet arrangement that can reduce the torque ripple.

An object of the present disclosure is to provide a rotor of an interior permanent magnet synchronous motor that can reduce the torque ripple.

A rotor of an interior permanent magnet synchronous motor, according to one aspect of the present embodiments, includes a plurality of poles. Each of the plurality of poles includes a plurality of magnets. The plurality of magnets is provided in such a manner that a magnetomotive force resulting from each magnet becomes weaker with increasing distance from a magnet center.

According to the embodiments, the magnetomotive force of the magnets is changed, thereby allowing restraining the harmonic components of magnetic flux density and reducing cogging torque.

The embodiments are described hereinafter with reference to the drawings. Descriptions of members having the same reference numerals as members already described in the detailed description are omitted for the convenience of description. Moreover, the dimensions of each member illustrated in the drawings may be different from actual dimensions thereof for the convenience of description.

FIG. 1 is a schematic diagram of an interior permanent magnet synchronous motor 100 that is used in a first embodiment of the present disclosure.

As illustrated in FIG. 1, the interior permanent magnet synchronous motor 100 includes a stator 2 fixed to a cylindrical housing 1, and a rotor 3 that can rotate relative to the stator 2.

The stator 2 includes a ring-shaped stator core 21. The stator core 21 is formed of a plurality of electromagnetic steel plates laminated along a direction of the rotation axis. The stator core 21 includes a plurality of stator coils 22 on an inner surface side thereof. The plurality of stator coils 22 is placed in a circular fashion, and is configured in such a manner that alternating current is applied thereto from the outside.

The rotor 3 includes a rotor core 31. The rotor core 31 is formed of a plurality of electromagnetic steel plates laminated along the direction of the rotation axis. The rotor core 31 is formed in the form of a cylinder. A shaft mounting hole 31a is formed in a radially central part of the rotor core 31. An unillustrated drive shaft is fixed in the shaft mounting hole 31a. The drive shaft is rotatably supported by the housing 1.

The rotor 3 includes 10 rotor magnets 3a to 3j in the rotor core 31. Each of the rotor magnets 3a to 3j includes a permanent magnet, and is embedded in a slot in the rotor core 31. The rotor magnets 3a to 3j are embedded in the slots to be firmly fixed therein. The rotor magnets 3a to 3e configure one pole. Moreover, the rotor magnets 3f to 3j configure one pole. The polarities of these poles are different from each other.

The details of the interior permanent magnet synchronous motor 100 used in the embodiments are described with a comparison with a rotor of an interior permanent magnet synchronous motor as a reference example. In order to do so, the rotor of the interior permanent magnet synchronous motor as the reference example is described with reference to FIGS. 2 to 4.

Figure 2:
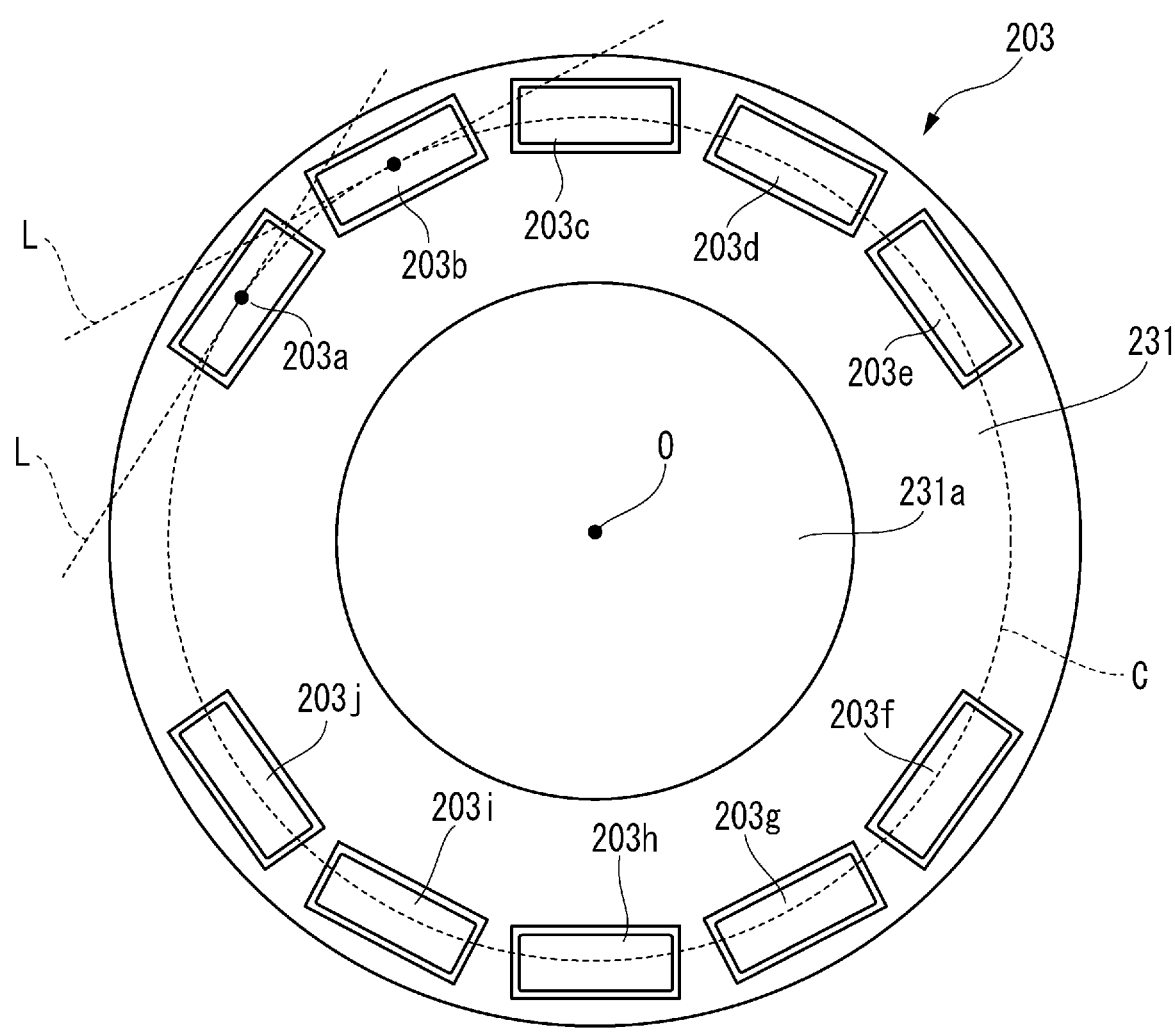
FIG. 2 is a horizontal cross-sectional view of a rotor of an interior permanent magnet synchronous motor used in a reference example.

FIG. 2 is a horizontal cross-sectional view of a rotor 203 of the interior permanent magnet synchronous motor as the reference example. As illustrated in FIG. 2, the rotor 203 includes a rotor core 231. The rotor core 231 is formed of a plurality of electromagnetic steel plates laminated along with a direction of the rotation axis. The rotor 203 includes 10 rotor magnets 203a to 203j in the rotor core 231. Each of the rotor magnets 203a to 203j includes a permanent magnet, and is embedded in a slit in the rotor core 231.

The rotor magnets 203a to 203j are formed in a shape of a cylindrical column, and have substantially the same size, and material or composition. Moreover, the rotor magnets 203a to 203j are placed at regular intervals on a circumference C centered around a rotation center O and along directions of tangents L to the circumference C, respectively. Therefore, the magnetomotive force for a stator coil resulting from each of the rotor magnets 203a to 203j is substantially equal.

Figure 3:
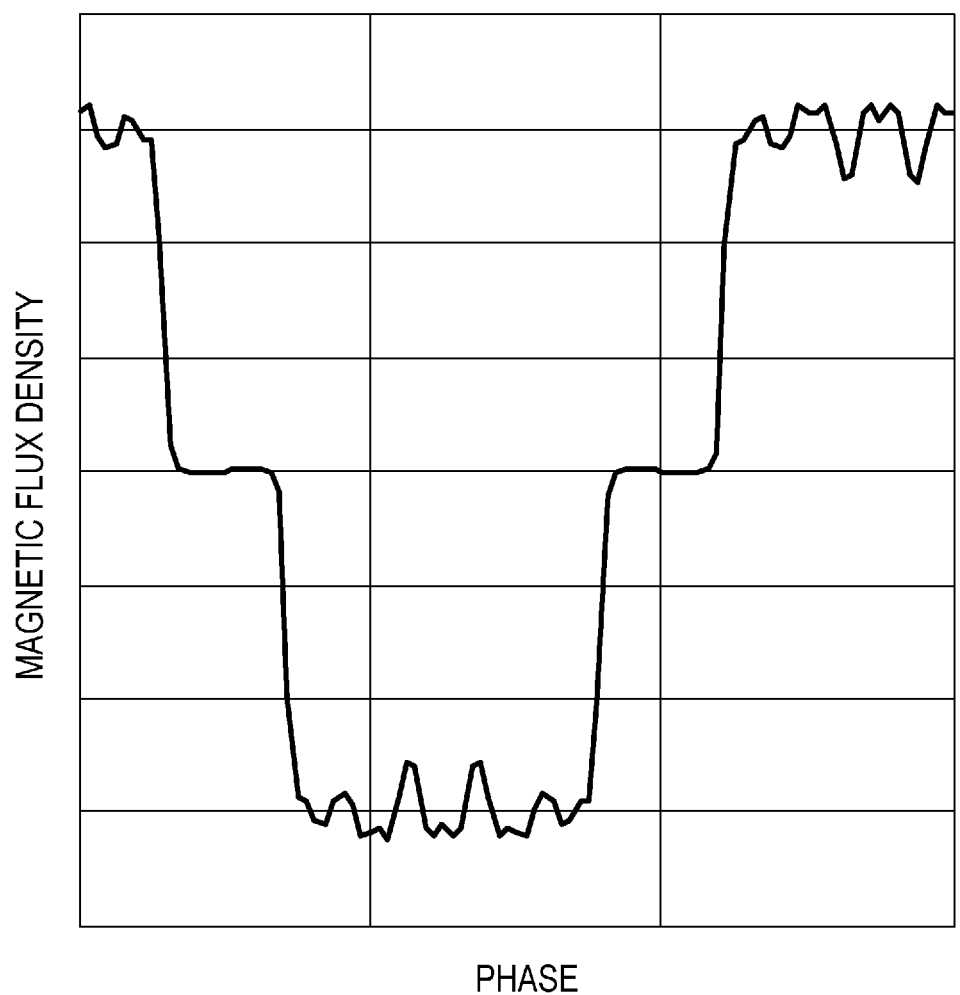
FIG. 3 illustrates a magnetic flux density waveform in the rotor of FIG. 2.
Figure 4:
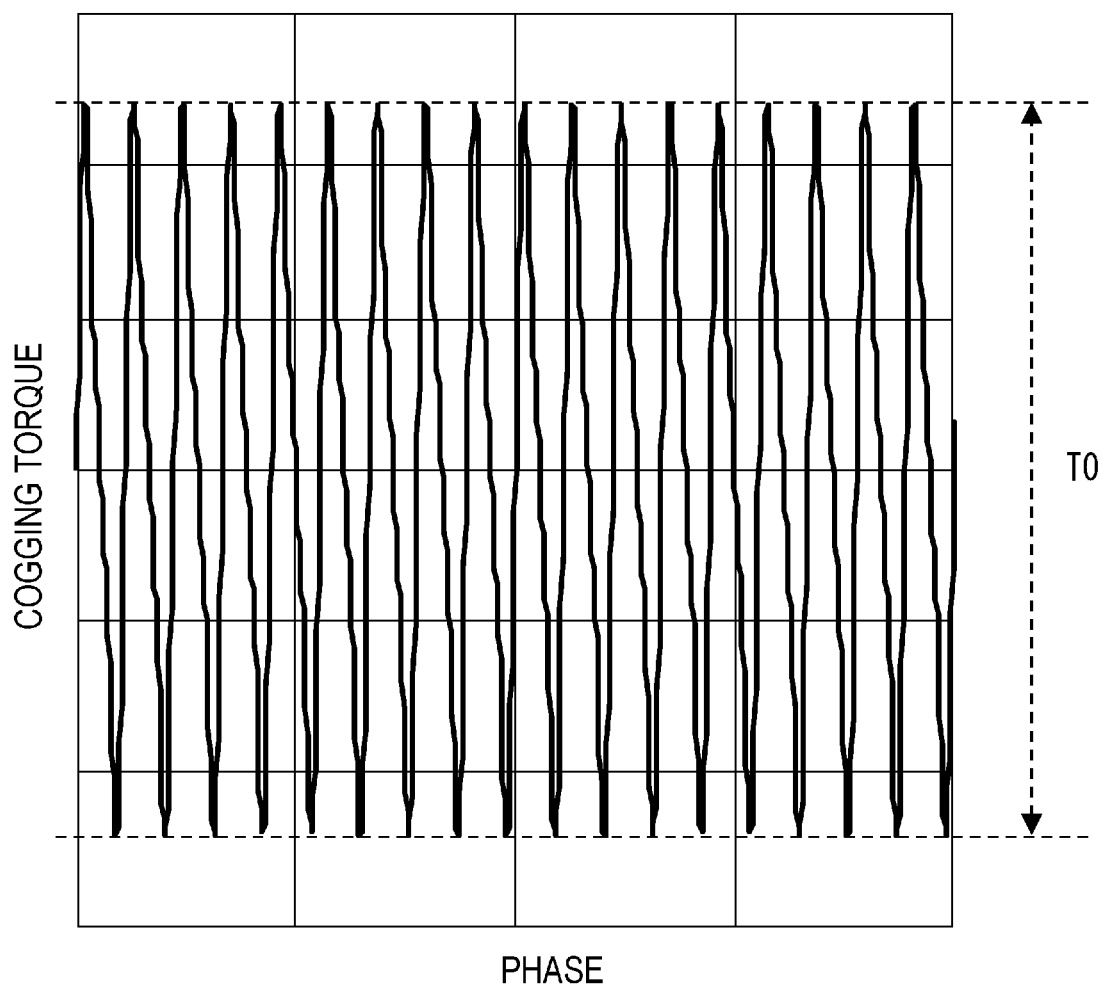
FIG. 4 illustrates a cogging torque waveform in the rotor of FIG. 2.

FIG. 3 illustrates a magnetic flux density waveform in the rotor 203 of FIG. 2. FIG. 4 illustrates a cogging torque waveform in the rotor 203 of FIG. 2.

As illustrated in FIG. 3, the magnetic flux density waveform in the rotor 203 of the interior permanent magnet synchronous motor as the reference example is similar to a quadrangular waveform such as a trapezoidal wave, a rectangular wave, or a square wave.

Generally, it is known that only the fundamental component made up of a sine wave in the magnetic flux density generated in the stator coil contributes to the rotational driving force of the motor. Moreover, it is known that if the magnetic flux density includes components other than the fundamental component in an air gap between the stator and the rotor, it can become a factor in deteriorating the performance of the motor as torque ripple or loss.

The present researchers have focused on the point that only the fundamental component made up of a sine wave in the magnetic flux density generated in the stator coil contributes to the rotational driving force of the motor. Moreover, the harmonic components, other than the fundamental component, included in the magnetic flux density in the air gap between the stator and the rotor can become a factor in deteriorating the performance of the motor as torque ripple or loss.

The magnetic flux density waveform illustrated in FIG. 3 is similar to a quadrangular waveform, which indicates that the harmonic components other than the fundamental component are included. Therefore, as illustrated in FIG. 4, cogging torque TO being torque ripple at no load increases. The increase of cogging torque can become a factor in deteriorating the performance of the motor.

First Embodiment

The rotor of the interior permanent magnet synchronous motor according to the first embodiment is described in detail below with reference to FIGS. 5 to 7.

Figure 5:
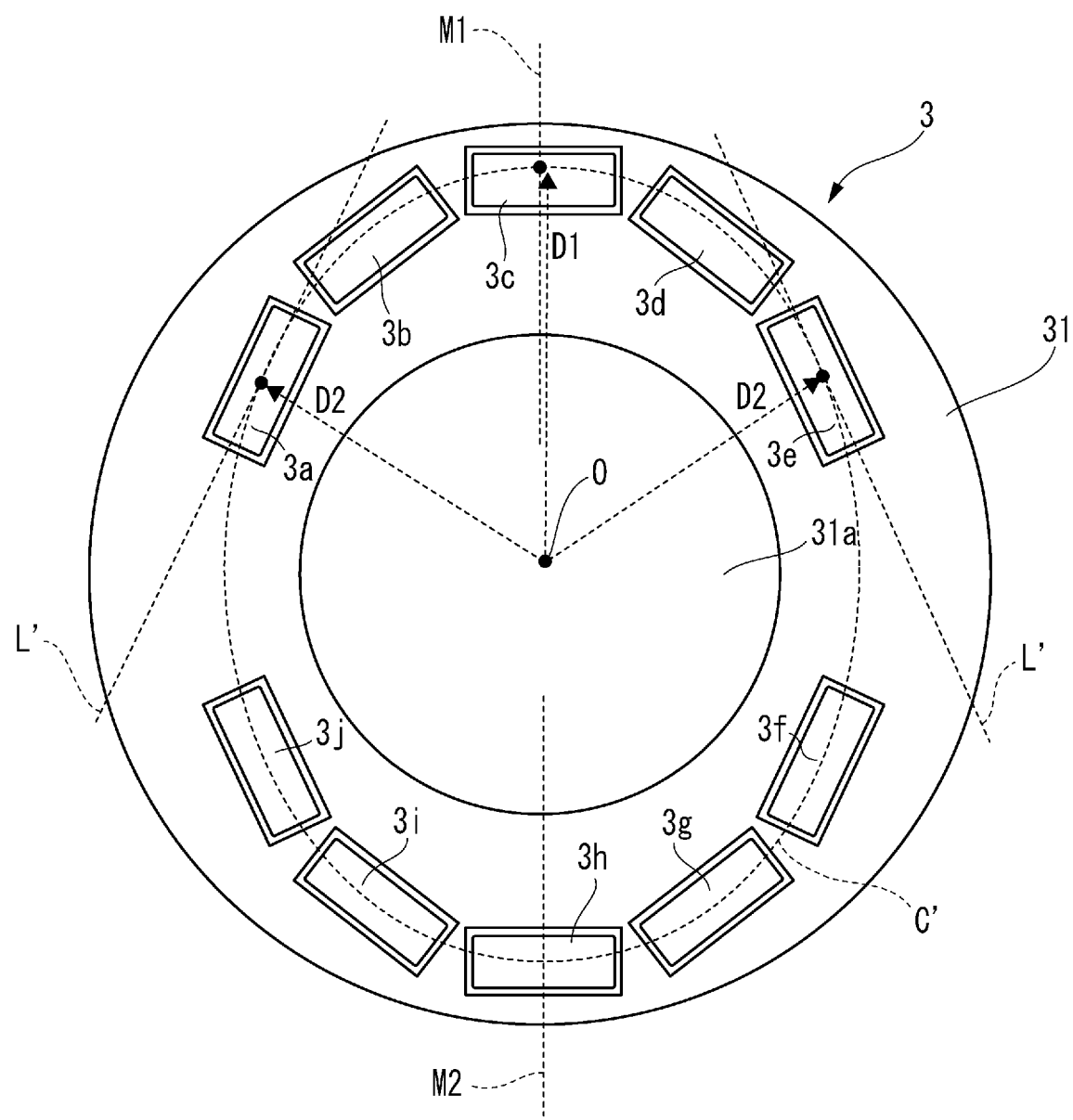
FIG. 5 is a horizontal cross-sectional view of the rotor of the interior permanent magnet synchronous motor according to the first embodiment.

FIG. 5 is a horizontal cross-sectional view of the rotor 3 of the interior permanent magnet synchronous motor 100 according to the first embodiment.

As illustrated in FIG. 5, the rotor magnets 3a to 3e are arranged in such a manner as to be displaced radially inward toward the rotation center O with increasing distance from a magnet center M1. In other words, the rotor magnets 3a to 3e are placed on an elliptic circumference C' centered around the rotation center O and along directions of tangents L' to the elliptic circumference C', respectively. Moreover, the rotor magnets 3a to 3e are arranged in such a manner that a radial dimension D2 from the rotation center O to the rotor magnets 3a and 3e that are the farthest from the magnet center M1 is smaller than a radial dimension D1 from the rotation center O to the rotor magnet 3c that is the closest to the magnet center M1. Hence, the magnetomotive force for the stator coil 22 resulting from each of the rotor magnets 3a to 3e becomes weaker with increasing distance from the magnet center M1. In other words, the magnetomotive force of the rotor magnet 3c for the stator coil 22 is the strongest, and the magnetomotive forces of the rotor magnets 3a and 3e for the stator coil 22 are the weakest.

Similarly, the rotor magnets 3f to 3j are also arranged in such a manner as to be displaced radially inward toward the rotation center O with increasing distance from a magnet center M2. Hence, the magnetomotive force for the stator coil 22 resulting from each of the rotor magnets 3f to 3j becomes weaker with increasing distance from the magnet center M2. In other words, the magnetomotive force of the rotor magnet 3h for the stator coil 22 is the strongest, and the magnetomotive forces of the rotor magnets 3f and 3j for the stator coil 22 are the weakest.

The points that the rotor magnets 3a to 3j are formed in the shape of a cylindrical column, and have substantially the same size, and material or composition are common with the rotor magnets 203a to 203j of the interior permanent magnet synchronous motor as the reference example illustrated in FIG. 2.

Figure 6:
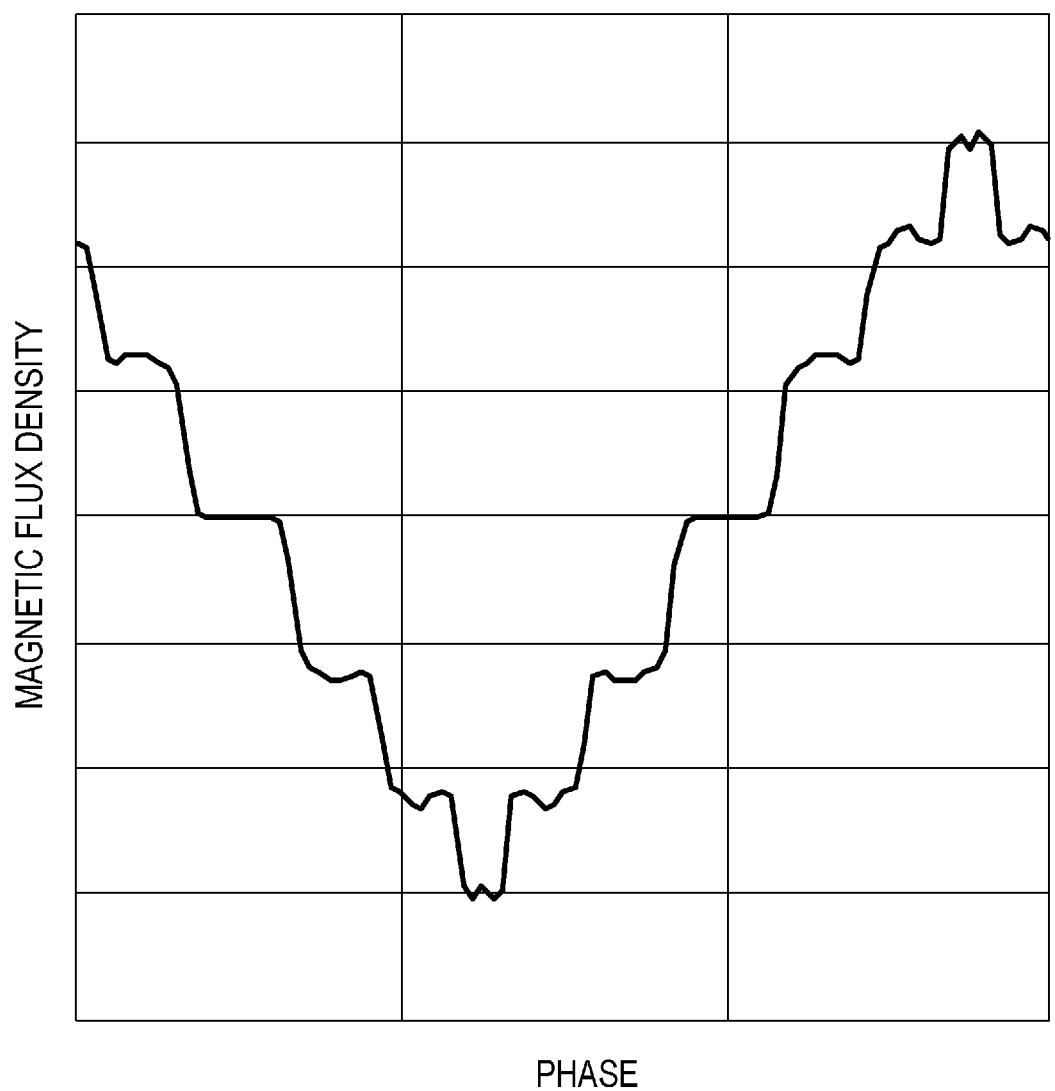
FIG. 6 illustrates a magnetic flux density waveform in the rotor of FIG. 5.

FIG. 6 illustrates a magnetic flux density waveform in the rotor of FIG. 5. FIG. 7 illustrates a cogging torque waveform in the rotor of FIG. 5.

As illustrated in FIG. 6, the magnetic flux density waveform in the rotor 3 of the interior permanent magnet synchronous motor according to the first embodiment is similar to the fundamental component made up of a sine wave as compared with the magnetic flux density waveform in the rotor 203 of the interior permanent magnet synchronous motor as the reference example, which is illustrated in FIG. 3. In other words, the harmonic components other than the fundamental component are reduced in the magnetic flux density waveform obtained in the first embodiment.

Figure 7:
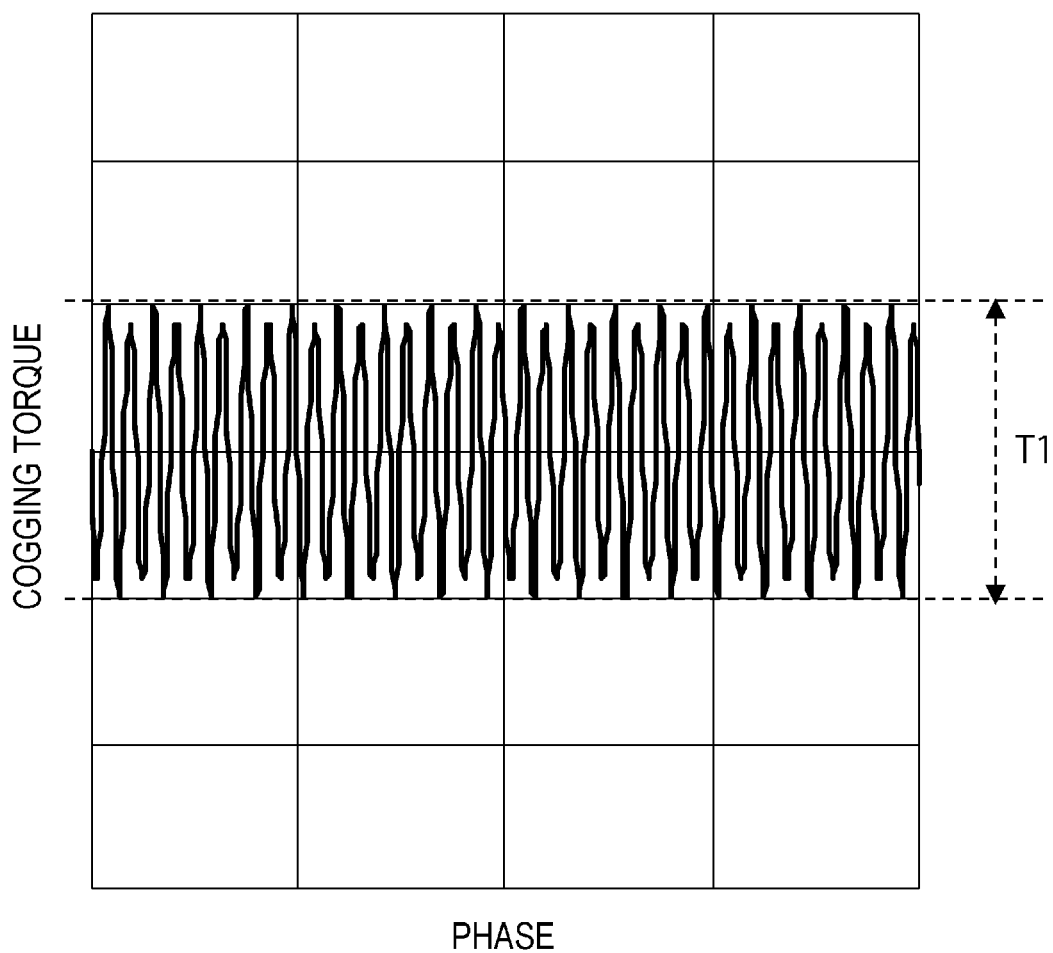
FIG. 7 illustrates a cogging torque waveform in the rotor of FIG. 5.

Consequently, in the first embodiment, cogging torque T1 is reduced as illustrated in FIG. 7. Moreover, the efficiency is also improved. In this manner, the performance of the motor can be improved.

Second Embodiment

A rotor of an interior permanent magnet synchronous motor according to a second embodiment is described in detail below with reference to FIGS. 8 to 10.

Figure 8:
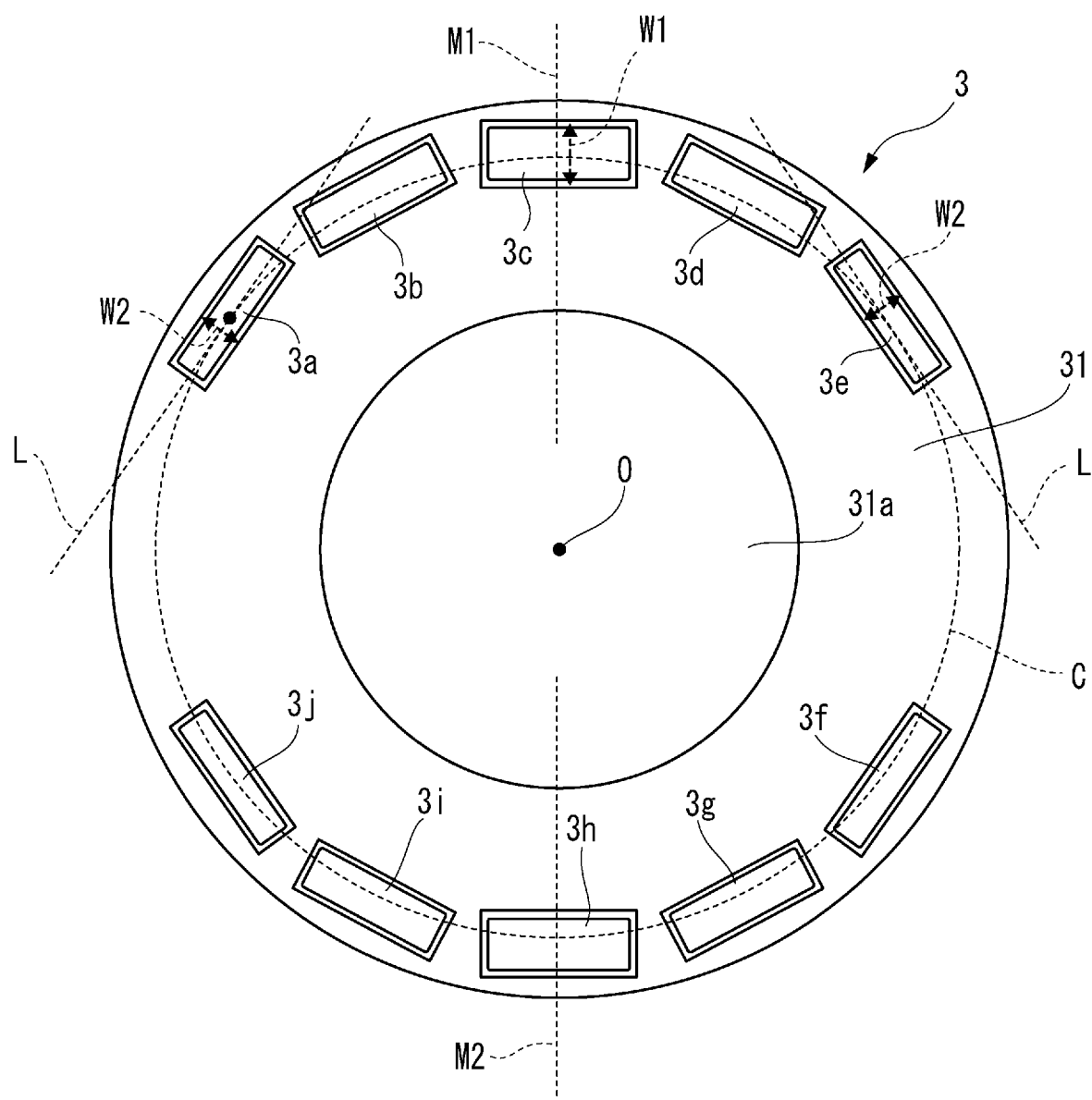
FIG. 8 is a horizontal cross-sectional view of a rotor of an interior permanent magnet synchronous motor according to a second embodiment.

FIG. 8 is a horizontal cross-sectional view of the rotor 3 of the interior permanent magnet synchronous motor according to the second embodiment.

As illustrated in FIG. 8, the farther the rotor magnets 3a to 3e are away from the magnet center M1, the smaller a radial width W is. In other words, the rotor magnet 3c that is the closest to the magnet center M1 has the largest radial width W1. The rotor magnets 3a and 3e that are the farthest from the magnet center M1 have the smallest radial width W2. Hence, the magnetomotive force for the stator coil 22 resulting from each of the rotor magnets 3a to 3e becomes weaker with increasing distance from the magnet center M1. In other words, the magnetomotive force of the rotor magnet 3c for the stator coil 22 is the strongest, and the magnetomotive forces of the rotor magnets 3a and 3e for the stator coil 22 are the weakest.

Similarly, the farther the rotor magnets 3f to 3j are away from the magnet center M2, the smaller the radial width W is. Hence, the magnetomotive force for the stator coil 22 resulting from each of the rotor magnets 3f to 3j becomes weaker with increasing distance from the magnet center M2. In other words, the magnetomotive force of the rotor magnet 3h for the stator coil 22 is the strongest, and the magnetomotive forces of the rotor magnets 3f and 3j for the stator coil 22 are the weakest.

The points that the rotor magnets 3a to 3j are formed in the shape of a cylindrical column, have substantially the same material or composition and, further, are placed at regular intervals along the directions of the tangents L to the circumference C centered around the rotation center O, respectively are common with the rotor magnets 203a to 203j of the interior permanent magnet synchronous motor as the reference example illustrated in FIG. 2.

In the second embodiment, the rotor core 31 is configured in such a manner that the radial widths W of the rotor magnets 3a to 3e and 3f to 3j are reduced as the rotor magnets are farther away from the magnet centers M1 and M2. However, the embodiment is not limited to this configuration. The rotor magnets may have a material or composition with a weaker magnetic force as the rotor magnets 3a to 3e are farther away from the magnet center M1, or as the rotor magnets 3f to 3j are farther away from the magnet center M2. For example, neodymium magnets with strong magnet force may be used as the rotor magnet 3c that is the closest to the magnet center M1 and the rotor magnet 3h that is the closest to the magnet center M2, whereas ferrite magnets with weak magnetic force may be used as the rotor magnets 3a and 3e that are the farthest from the magnet center M1 and the rotor magnets 3f and 3j that are the farthest from the magnet center M2.

Figure 9:
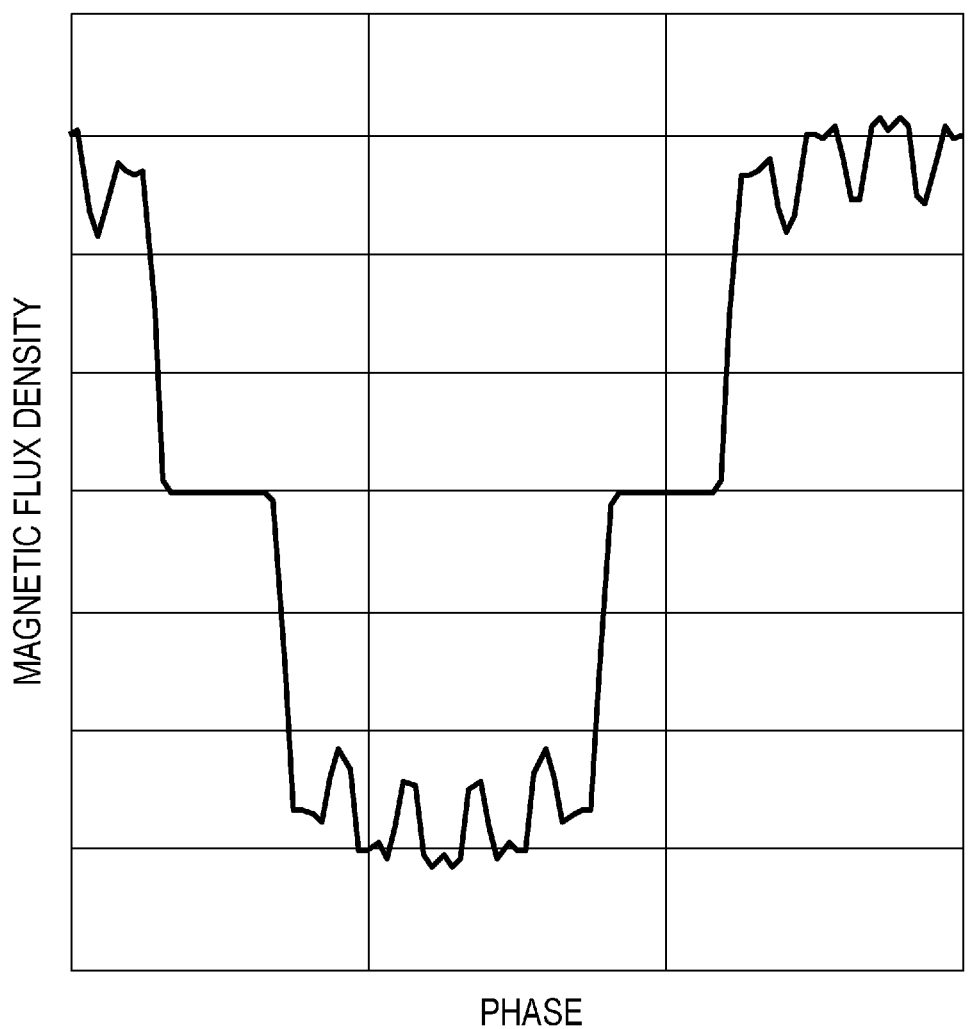
FIG. 9 illustrates a magnetic flux density waveform in the rotor of FIG. 8.

FIG. 9 illustrates a magnetic flux density waveform in the rotor of FIG. 8. FIG. 10 illustrates a cogging torque waveform in the rotor of FIG. 8.

As illustrated in FIG. 9, the magnetic flux density waveform in the rotor 3 of the interior permanent magnet synchronous motor according to the second embodiment is similar to the fundamental component made up of a sine wave as compared with the magnetic flux density waveform in the rotor 203 of the interior permanent magnet synchronous motor as the reference example, which is illustrated in FIG. 3. In other words, the harmonic components other than the fundamental component are reduced in the magnetic flux density waveform obtained in the second embodiment.

Figure 10:
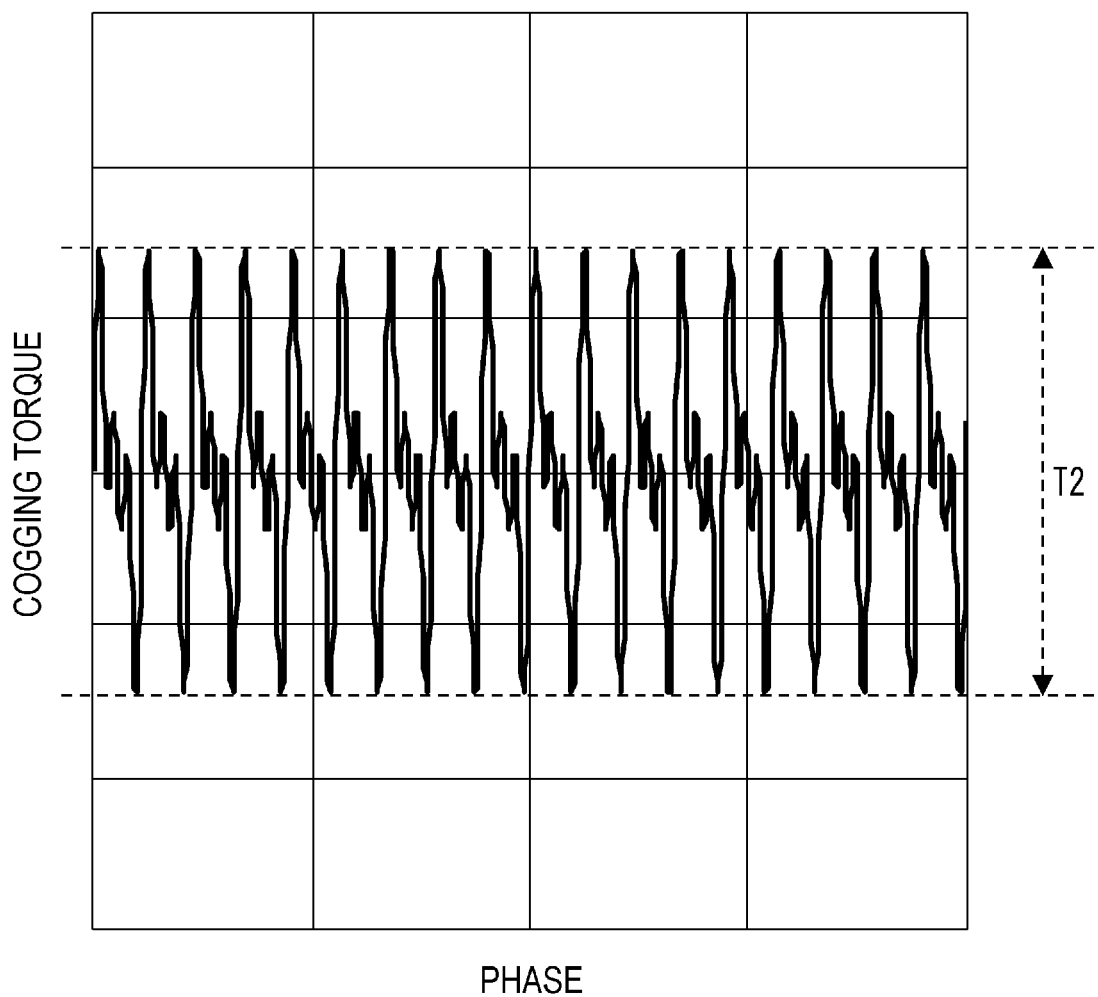
FIG. 10 illustrates a cogging torque waveform in the rotor of FIG. 8.

Consequently, in the second embodiment, cogging torque T2 is reduced as illustrated in FIG. 10. Moreover, the efficiency is also improved. In this manner, the performance of the motor can be improved.

Third Embodiment

A rotor of an interior permanent magnet synchronous motor according to a third embodiment is described in detail below with reference to FIGS. 11 to 14.

Figure 11:
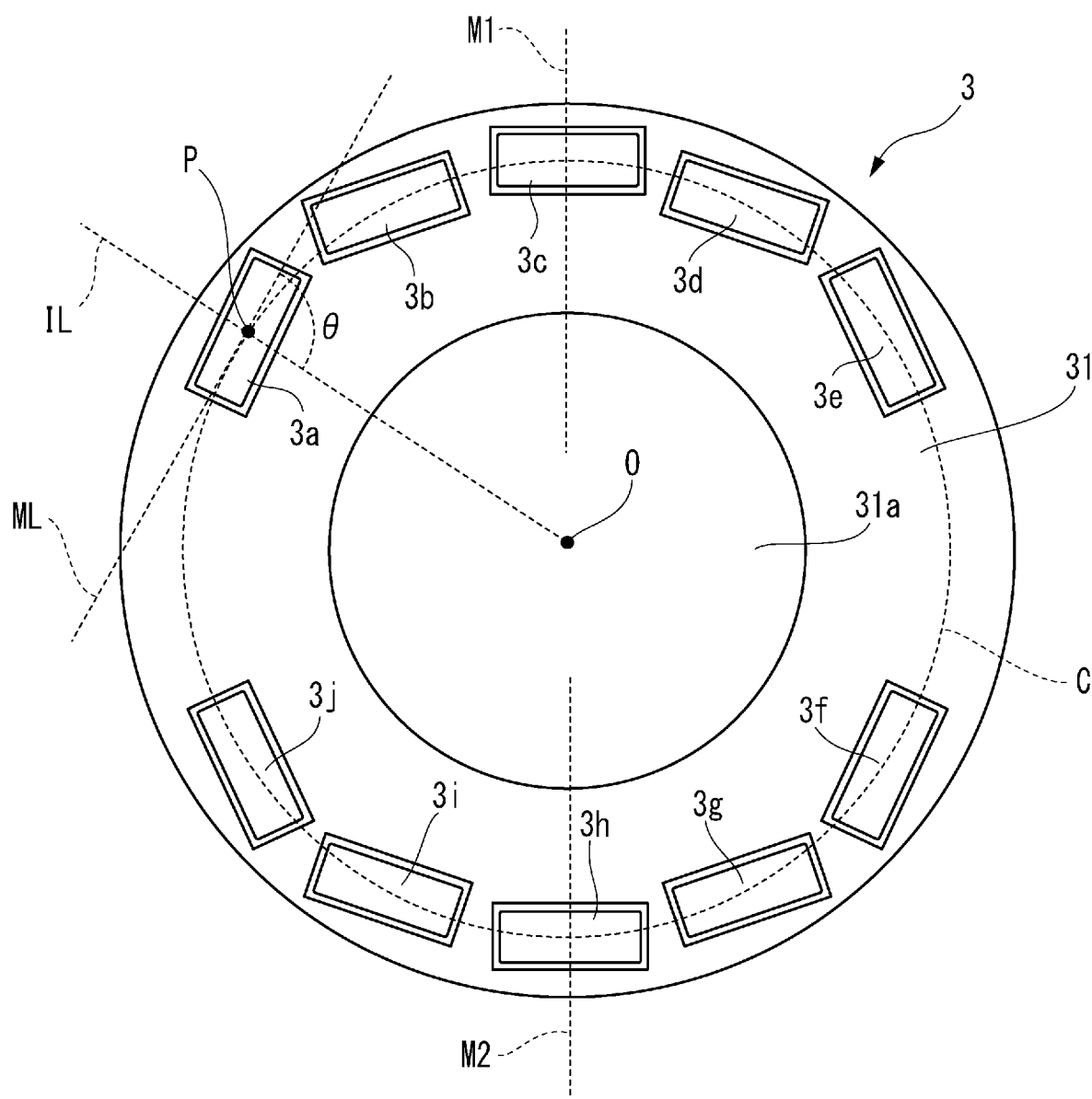
FIG. 11 is a horizontal cross-sectional view of a rotor of an interior permanent magnet synchronous motor according to a third embodiment.
Figure 12:
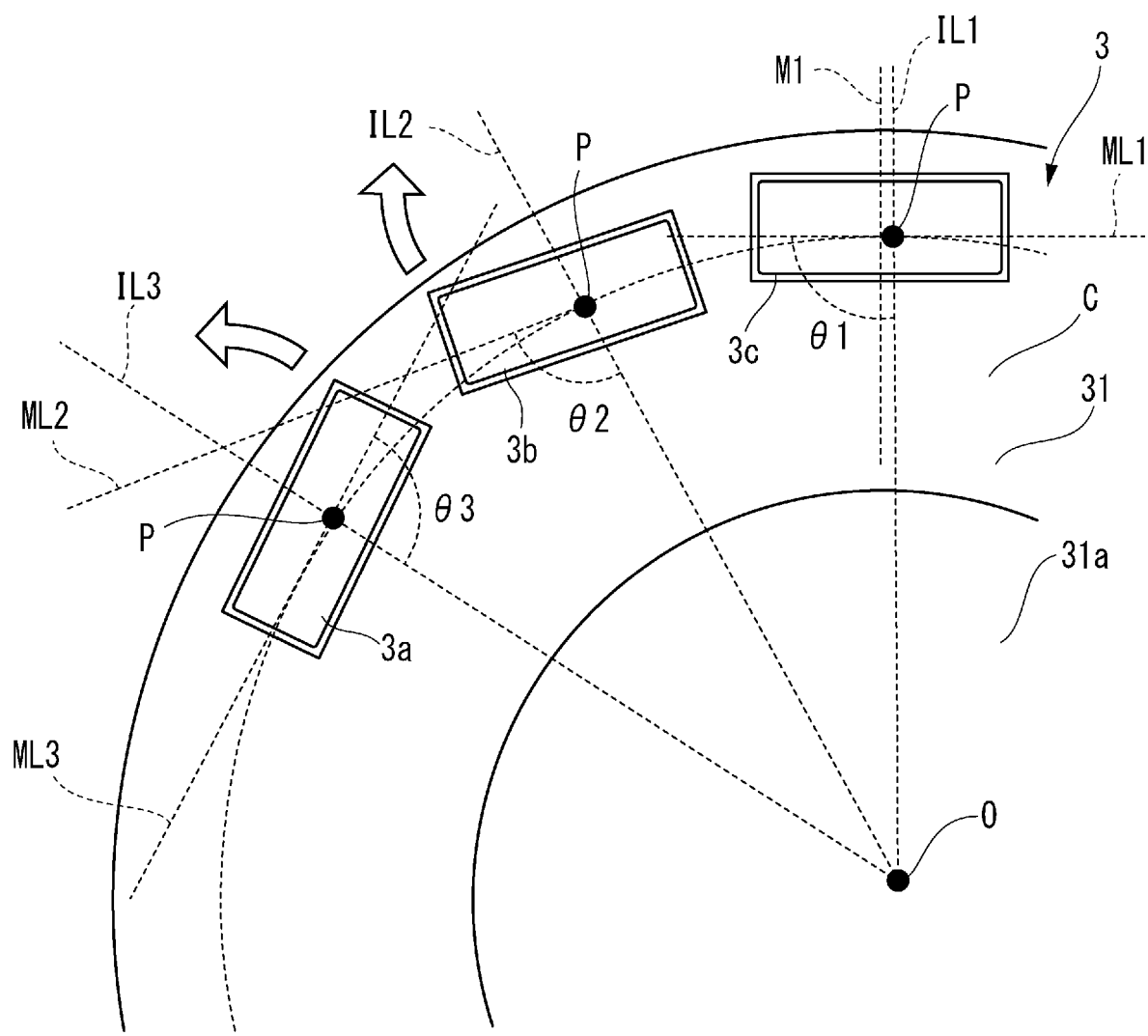
FIG. 12 is a partial enlarged view of FIG. 11.

FIG. 11 is a horizontal cross-sectional view of the rotor 3 of the interior permanent magnet synchronous motor according to the third embodiment. FIG. 12 is a partial enlarged view of FIG. 11.

As illustrated in FIG. 11, the rotor magnets 3a to 3e are arranged on the circumference C centered around the rotation center O. Moreover, an angle θ formed by an imaginary line IL extending radially from the rotation center O through a center point P of each of the rotor magnets 3a to 3e, and a center line ML in the longitudinal direction increases as the rotor magnets 3a to 3e are farther away from the magnet center M1. The center point P indicates the center of the each of the rotor magnets 3a to 3e. Moreover, the angle θ indicates the larger angle of two angels formed by two straight lines intersecting with each other. Hence, the magnetomotive force for the stator coil 22 resulting from the each of the rotor magnets 3a to 3e becomes weaker with increasing distance from the magnet center M1. In other words, the magnetomotive force of the rotor magnet 3c for the stator coil 22 is the strongest, and the magnetomotive forces of the rotor magnets 3a and 3e for the stator coil 22 are the weakest.

In the embodiment, two adjacent rotor magnets excluding the rotor magnet 3c that is the closest to the magnet center M1 have been rotated in opposite directions (arrow directions in FIG. 12) relative to tangential directions at the center points P thereof, respectively, as illustrated in FIG. 12. Moreover, the angle θ of the each of the rotor magnets 3a to 3e increases as the rotor magnets are farther away from the magnet center M1. Specifically, in terms of the rotor magnet 3c that is the closest to the magnet center M1, an angle θ1 formed by an imaginary line IL1 and a center line ML1 is 90 degrees. The rotor magnet 3b that is the second closest to the magnet center M1 after the rotor magnet 3c has been rotated in a clockwise direction relative to the tangential direction at the center point P thereof. As a result, an imaginary line IL2 and a center line ML2 form an angle θ2. Similarly, the rotor magnet 3a that is the farthest from the magnet center M1 has been rotated in a counterclockwise direction relative to the tangential direction at the center point P thereof. As a result, an imaginary line IL3 and a center line ML3 form an angle θ3. The angle θ3 of the rotor magnet 3a and the angle θ2 of the rotor magnet 3b face each other. The angle θ increases in the order of θ1, θ2, and then θ3.

Similarly, the angle θ of each of the rotor magnets 3f to 3j also increases as the rotor magnets 3f to 3j are farther away from the magnet center M2. Hence, the magnetomotive force for the stator coil 22 resulting from the each of the rotor magnets 3f to 3j becomes weaker with increasing distance from the magnet center M2. In other words, the magnetomotive force of the rotor magnet 3h for the stator coil 22 is the strongest, and the magnetomotive forces of the rotor magnets 3f and 3j for the stator coil 22 are the weakest.

The points that the rotor magnets 3a to 3j are formed in the shape of a cylindrical column, have substantially the same size, and material or composition and, further, are placed at regular intervals on the circumference C centered around the rotation center O are common with the rotor magnets 203a to 203j of the interior permanent magnet synchronous motor as the reference example illustrated in FIG. 2.

In FIGS. 11 to 14, the example where the rotation directions of the plurality of rotor magnets are opposite to each other. However, the embodiment is not limited to this example. The rotation directions of the plurality of rotor magnets may be the same. Alternatively, the rotation directions may be random directions.

Figure 13:
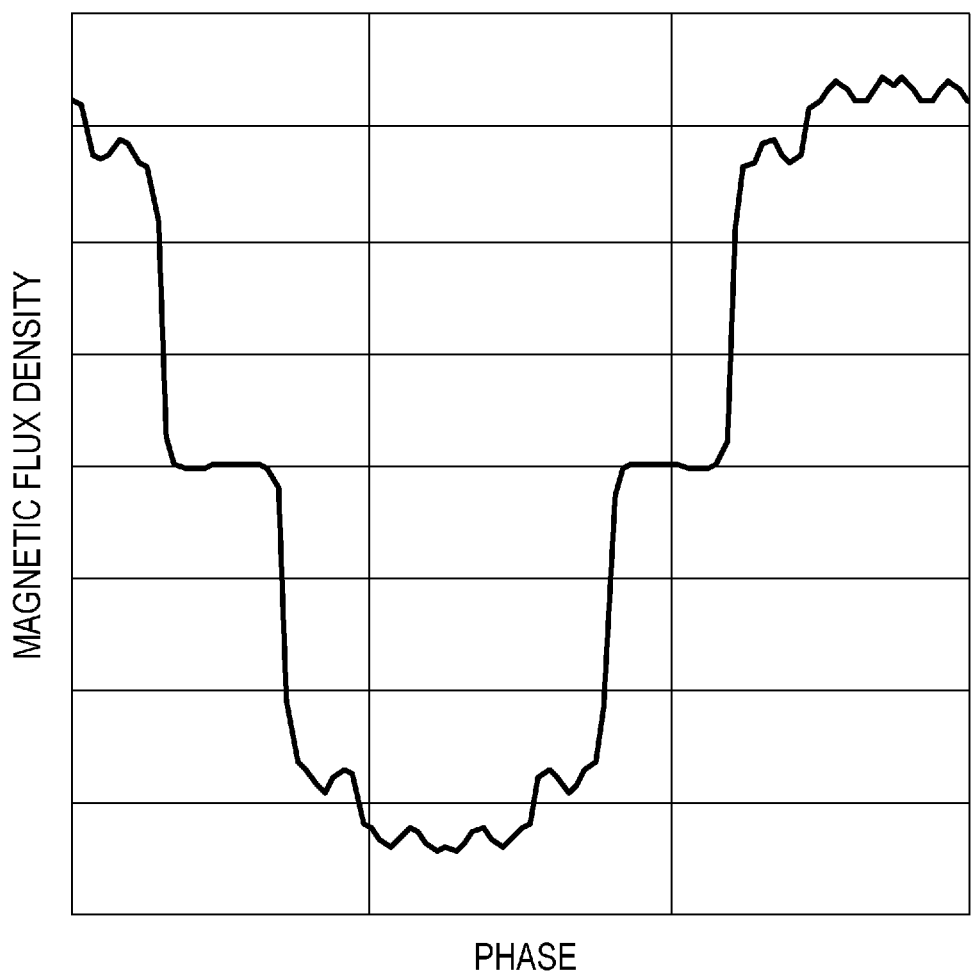
FIG. 13 illustrates a magnetic flux density waveform in the rotor of FIG. 11.
Figure 14:
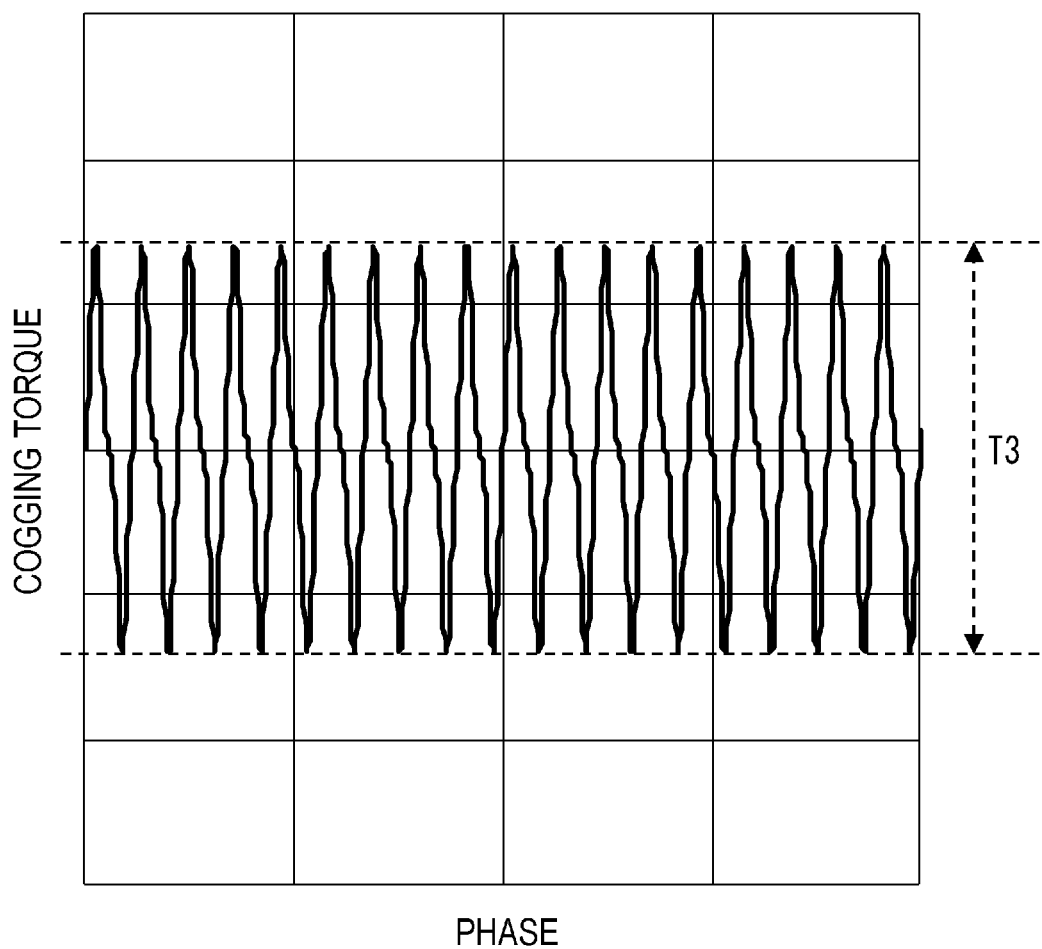
FIG. 14 illustrates a cogging torque waveform in the rotor of FIG. 11.

FIG. 13 illustrates a magnetic flux density waveform in the rotor of FIG. 11. FIG. 14 illustrates a cogging torque waveform in the rotor of FIG. 11.

As illustrated in FIG. 13, the magnetic flux density waveform in the rotor 3 of the interior permanent magnet synchronous motor according to the third embodiment is similar to the fundamental component made up of a sine wave as compared with the magnetic flux density waveform in the rotor 203 of the interior permanent magnet synchronous motor as the reference example, which is illustrated in FIG. 3. In other words, the harmonic components other than the fundamental component are reduced in the magnetic flux density waveform obtained in the third embodiment.

Consequently, in the third embodiment, cogging torque T3 is reduced as illustrated in FIG. 14. Moreover, the efficiency is also improved. In this manner, the performance of the motor can be improved.

Fourth Embodiment

A rotor of an interior permanent magnet synchronous motor according to a fourth embodiment is described in detail below with reference to FIGS. 15 to 18. The fourth embodiment includes a configuration having a combination of the first and third embodiments.

Figure 15:
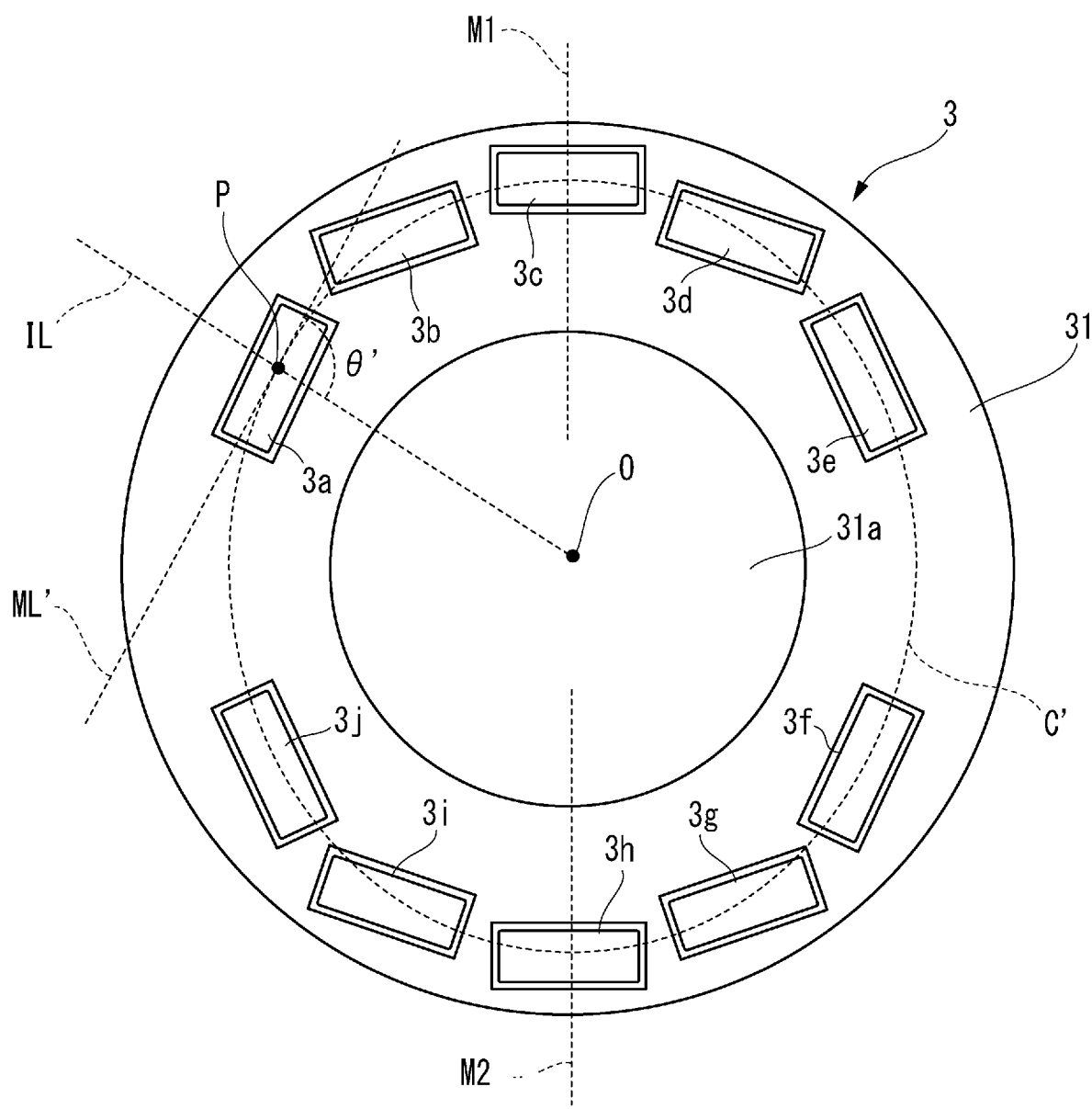
FIG. 15 is a horizontal cross-sectional view of a rotor of an interior permanent magnet synchronous motor according to a fourth embodiment.
Figure 16:
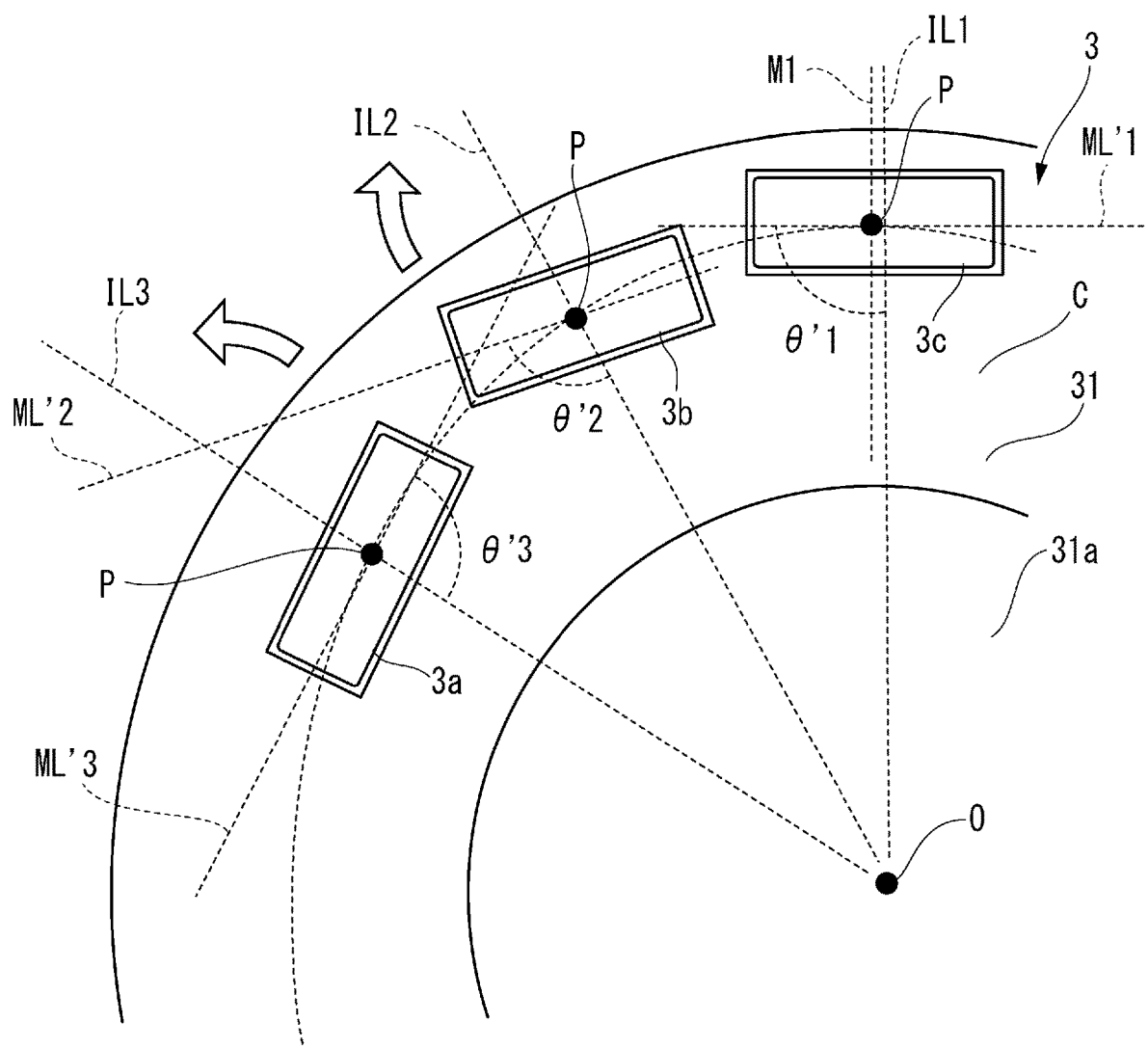
FIG. 16 is a partial enlarged view of FIG. 15.

FIG. 15 is a horizontal cross-sectional view of the rotor 3 of the interior permanent magnet synchronous motor according to the fourth embodiment. FIG. 16 is a partial enlarged view of FIG. 15.

As illustrated in FIG. 15, the rotor magnets 3a to 3e are arranged on the elliptic circumference C' centered around the rotation center O. Moreover, an angle θ' formed by the imaginary line IL extending radially from the rotation center O through the center point P of each of the rotor magnets 3a to 3e, and a center line ML' in the longitudinal direction increases as the rotor magnets 3a to 3e are farther away from the magnet center M1. The center point P indicates the center of the each of the rotor magnets 3a to 3e. Moreover, the angle θ' indicates the larger angle of two angels formed by two straight lines intersecting with each other. Hence, the magnetomotive force for the stator coil 22 resulting from the each of the rotor magnets 3a to 3e becomes weaker with increasing distance from the magnet center M1. In other words, the magnetomotive force of the rotor magnet 3c for the stator coil 22 is the strongest, and the magnetomotive forces of the rotor magnets 3a and 3e for the stator coil 22 are the weakest.

In the embodiment, two adjacent rotor magnets excluding the rotor magnet 3c that is the closest to the magnet center M1 have been rotated in opposite directions (arrow directions in FIG. 16) relative to tangential directions at the center points P thereof, respectively, as in the third embodiment. Moreover, the angle θ' of the each of the rotor magnets 3a to 3e increases as the rotor magnets are farther away from the magnet center M1. Hence, as illustrated in FIG. 16, an angle θ'3 of the rotor magnet 3a and an angle θ'2 of the rotor magnet 3b face each other. The angle θ' increases in the order of θ'1, θ'2, and then θ'3.

Similarly, the angle θ' of each of the rotor magnets 3f to 3j also increases as the rotor magnets 3f to 3j are farther away from the magnet center M2. Hence, the magnetomotive force for the stator coil 22 resulting from the each of the rotor magnets 3f to 3j becomes weaker with increasing distance from the magnet center M2. In other words, the magnetomotive force of the rotor magnet 3h for the stator coil 22 is the strongest, and the magnetomotive forces of the rotor magnets 3f and 3j for the stator coil 22 are the weakest.

The points that the rotor magnets 3a to 3j are formed in the shape of a cylindrical column, have substantially the same size, and material or composition and, further, are placed at regular intervals are common with the rotor magnets 203a to 203j of the interior permanent magnet synchronous motor as the reference example illustrated in FIG. 2.

In FIGS. 15 to 18, the example where the rotation directions of the plurality of rotor magnets are opposite to each other. However, the embodiment is not limited to this example. The rotation directions of the plurality of rotor magnets may be the same. Alternatively, the rotation directions may be random directions.

Figure 17:
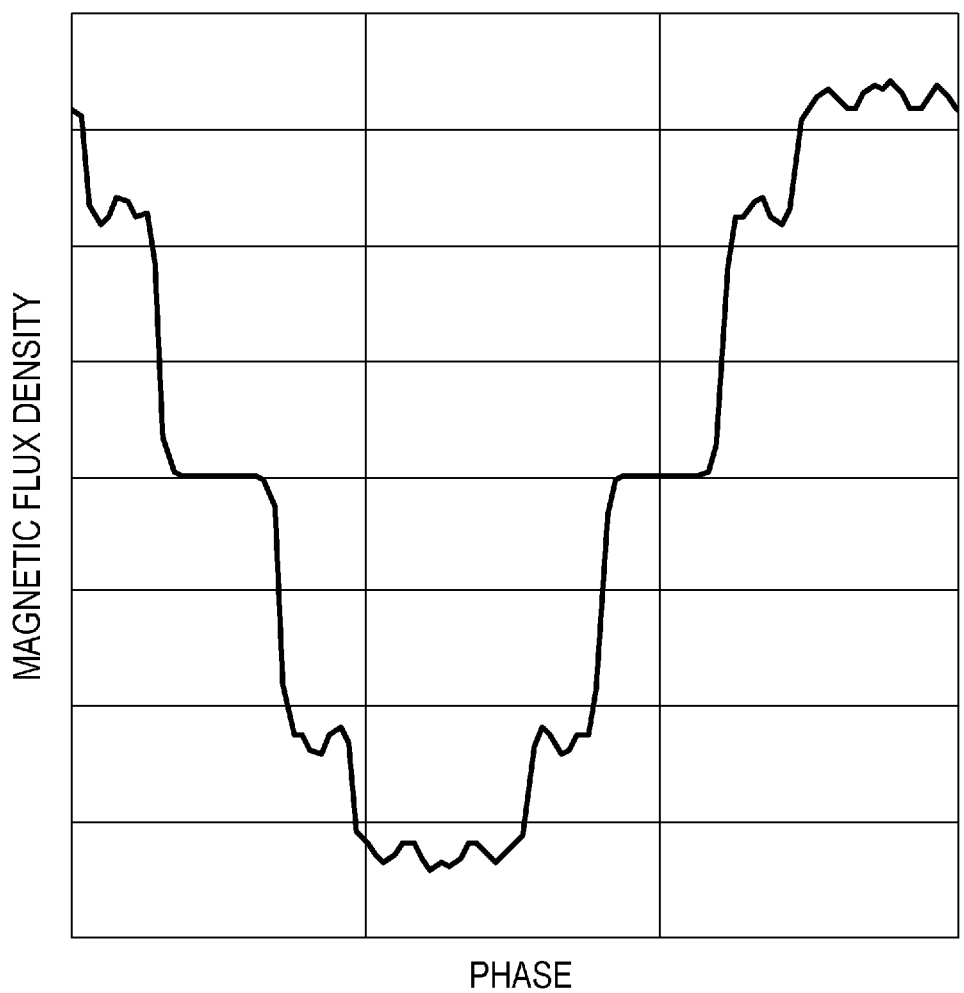
FIG. 17 illustrates a magnetic flux density waveform in the rotor of FIG. 15.
Figure 18:
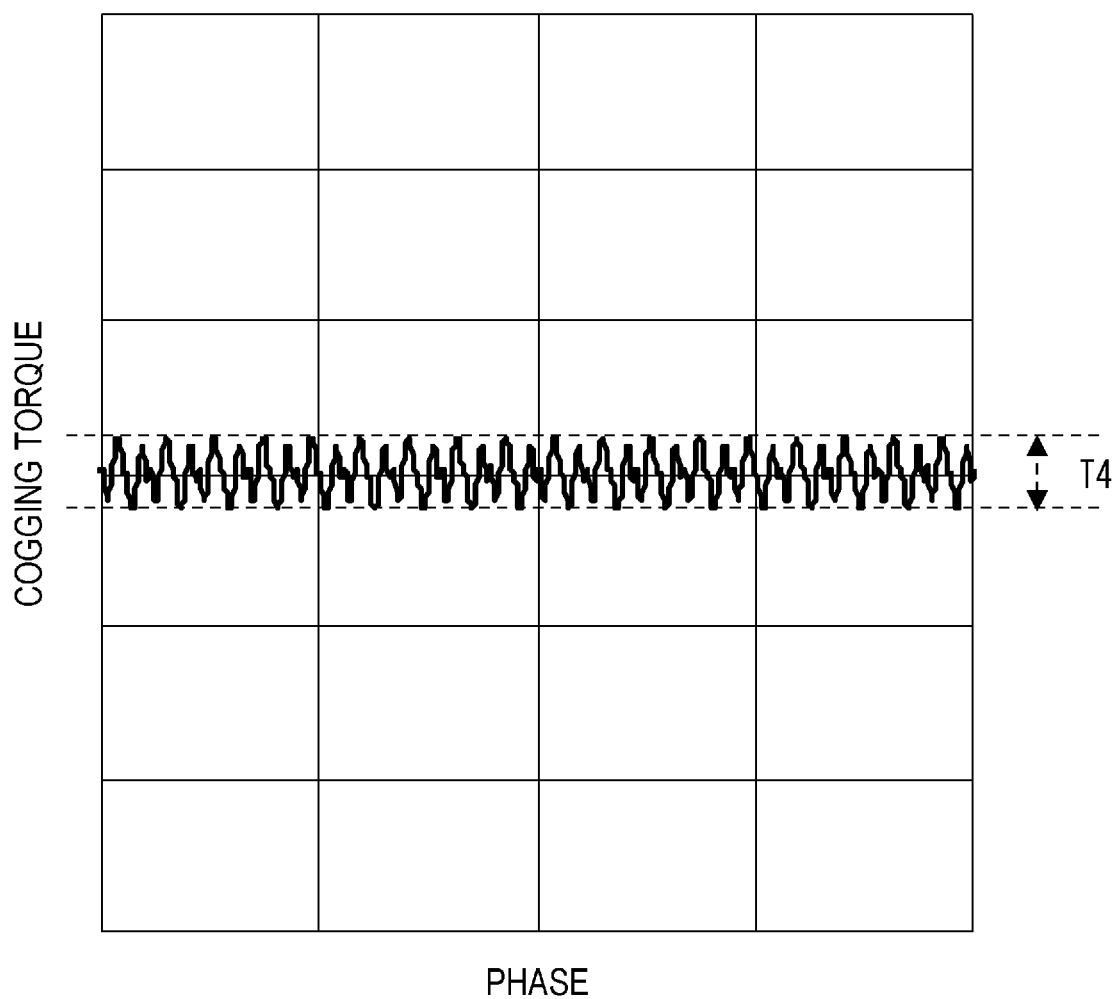
FIG. 18 illustrates a cogging torque waveform in the rotor of FIG. 15.

FIG. 17 illustrates a magnetic flux density waveform in the rotor of FIG. 15. FIG. 18 illustrates a cogging torque waveform in the rotor of FIG. 15.

As illustrated in FIG. 17, the magnetic flux density waveform in the rotor 3 of the interior permanent magnet synchronous motor according to the fourth embodiment is similar to the fundamental component made up of a sine wave as compared with the magnetic flux density waveform in the rotor 203 of the interior permanent magnet synchronous motor as the reference example, which is illustrated in FIG. 3. In other words, the harmonic components other than the fundamental component are reduced in the magnetic flux density waveform obtained in the fourth embodiment.

Consequently, in the fourth embodiment, cogging torque T4 is reduced as illustrated in FIG. 18. Moreover, the efficiency is also improved. In this manner, the performance of the motor can be improved. Consequently, the cogging torque is reduced the most in comparison with the cogging torque T1 in the first embodiment illustrated in FIG. 7, the cogging torque T2 in the second embodiment illustrated in FIG. 10, and the cogging torque T3 in the third embodiment illustrated in FIG. 14. As a result, the performance of the motor can be significantly improved.

The above-mentioned fourth embodiment includes the configuration having the combination of the first and third embodiments. However, the embodiment may include a combination of the first and second embodiments. Alternatively, the embodiment may include a configuration having a combination of all of the first, second, and third embodiments.

Other Embodiments

Figure 19:
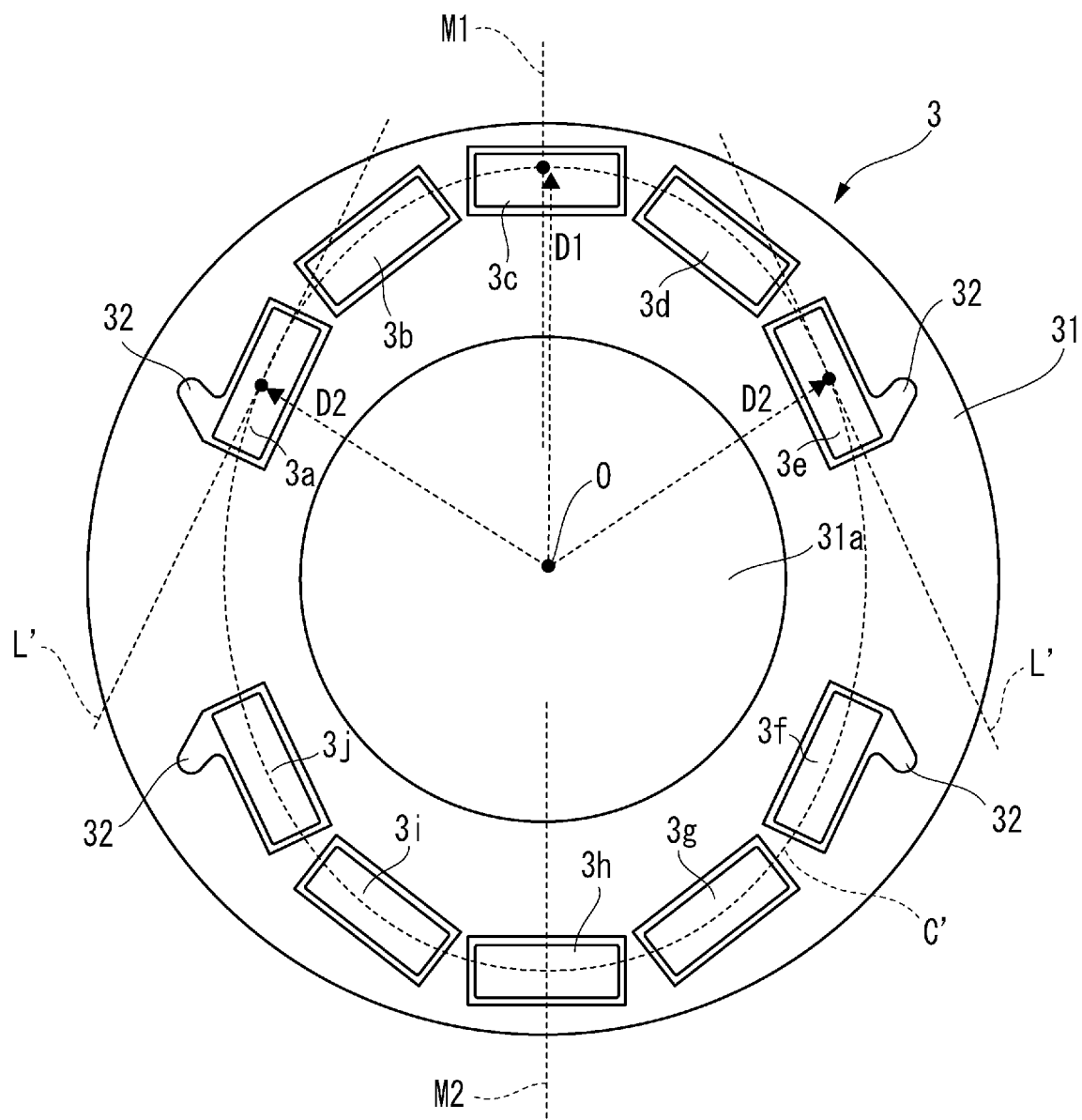
FIG. 19 is a horizontal cross-sectional view of the rotor of the interior permanent magnet synchronous motor according to a first modification of the first embodiment.

The embodiments are not limited to the above-mentioned embodiments. These embodiments can also be modified as follows:

FIG. 19 is a horizontal cross-sectional view of the rotor 3 of the interior permanent magnet synchronous motor 100 according to a first modification of the first embodiment.

As illustrated in FIG. 19, a flux barrier 32 extending radially is provided on the outer peripheral side of an end portion, which is far from the magnet center M1, of each of the farthest rotor magnets 3a and 3e from the magnet center M1 among the rotor magnets 3a to 3e. The flux barriers 32 are spaces formed in the rotor core 31 to obstruct q-axis magnetic flux of the rotor magnets 3a to 3e.

As illustrated in FIG. 19, the rotor magnets 3a to 3e are arranged in such a manner as to be displaced radially inward toward the rotation center O with increasing distance from the magnet center M1. In this case, there is concern about the q-axis magnetic flux of the rotor magnets 3a to 3e leaking and flowing between the rotor's perimeter and the rotor magnets 3a and 3e located on the radially inner side. In this case, reluctance torque may be reduced. Hence, the flux barriers 32 are provided in areas between the rotor's perimeter and the rotor magnets 3a and 3e located on the radially inner side. The flux barriers 32 obstruct the magnetic flux that attempts to pass through these areas. Hence, the q-axis magnetic flux does not become weak. As a result, a reduction in reluctance torque can be restrained.

The flux barrier 32 extending radially is also provided on the outer peripheral side of an end portion, which is far from the magnet center M2, of each of the farthest rotor magnets 3f and 3j from the magnet center M2 among the rotor magnets 3f to 3j.

In the structure of the rotor 3 illustrated in FIG. 19, the flux barriers 32 are connected to parts of insertion holes of the rotor magnets 3a and 3e. However, the flux barriers 32 and the insertion holes may be separated.

Figure 20:
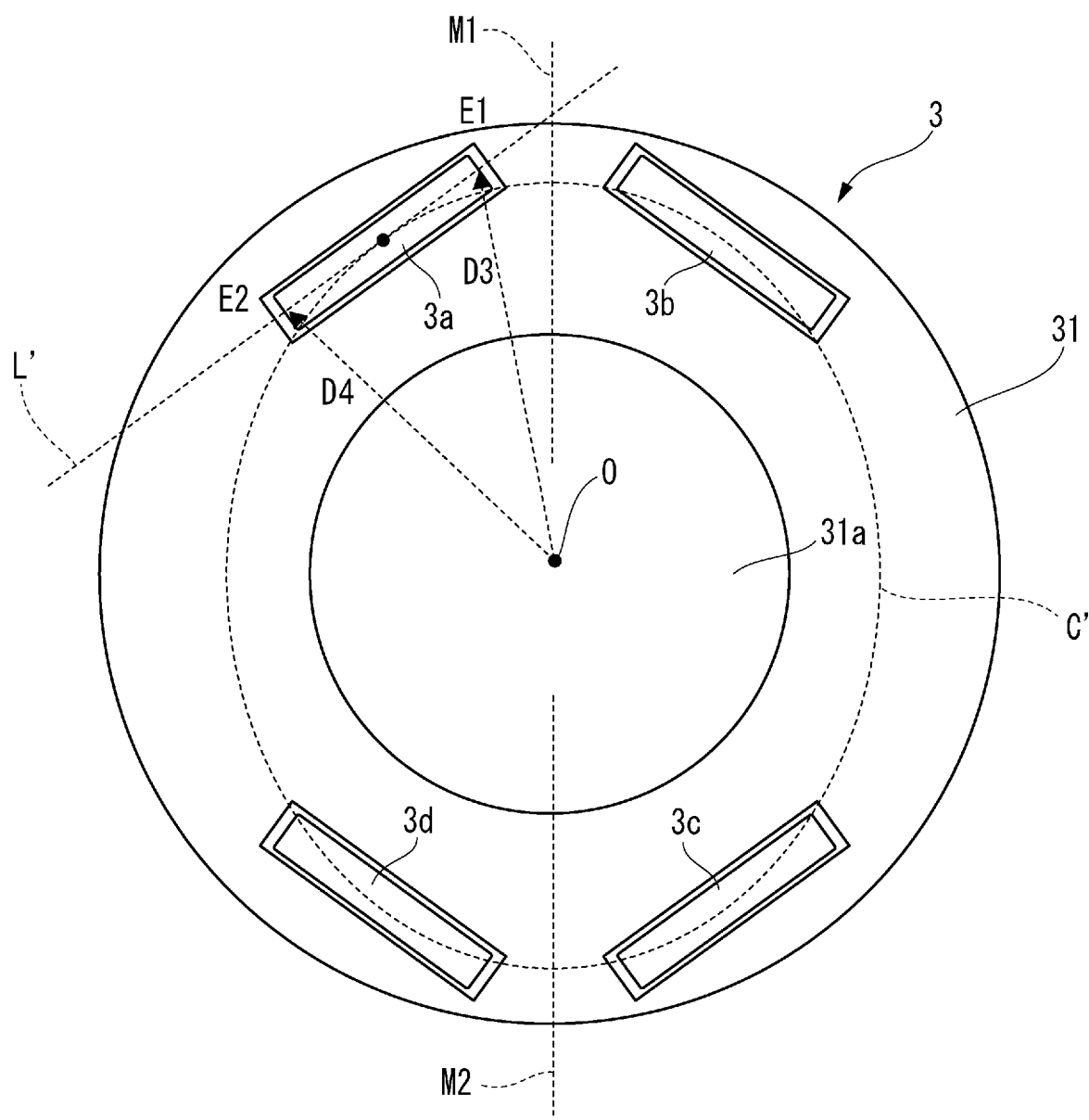
FIG. 20 is a horizontal cross-sectional view of the rotor of the interior permanent magnet synchronous motor according to a second modification of the first embodiment.

FIG. 20 is a horizontal cross-sectional view of the rotor 3 of the interior permanent magnet synchronous motor 100 according to a second modification of the first embodiment.

As illustrated in FIG. 20, the rotor 3 includes four rotor magnets 3a to 3d in the rotor core 31. The rotor magnets 3a and 3b configure one pole. Moreover, the rotor magnets 3c and 3d configure one pole. The polarities of these poles are different from each other.

Each of the rotor magnets 3a and 3b includes one end portion E1 that is close to the magnet center M1, and the other end portion E2 that is far from the magnet center M1. Moreover, the rotor magnets 3a and 3b are arranged in such a manner that a radial dimension D4 from the rotation center O to the other end portion E2 is smaller than a radial dimension D3 from the rotation center O to the one end portion E1. In other words, the rotor magnets 3a and 3b are placed on the elliptic circumference C' centered around the rotation center O and along the directions of the tangents L' to the elliptic circumference C', respectively. Hence, the magnetomotive force for the stator coil 22 in the each of the rotor magnets 3a and 3b becomes weaker with increasing distance from the magnet center M1. In other words, the magnetomotive force for the stator coil 22 is the strongest at the one end portion E1 close to the magnet center M1, and is the weakest at the other end portion E2 far from the magnet center M1.

Similarly, the rotor magnets 3c and 3d are also arranged in such a manner that the radial dimension D4 from the rotation center O to the other end portion E2 is smaller than the radial dimension D3 from the rotation center O to the one end portion E1. Hence, the magnetomotive force for the stator coil 22 is the strongest at the one end portion E1 close to the magnet center M2, and is the weakest at the other end portion E2 far from the magnet center M2.

Figure 21:
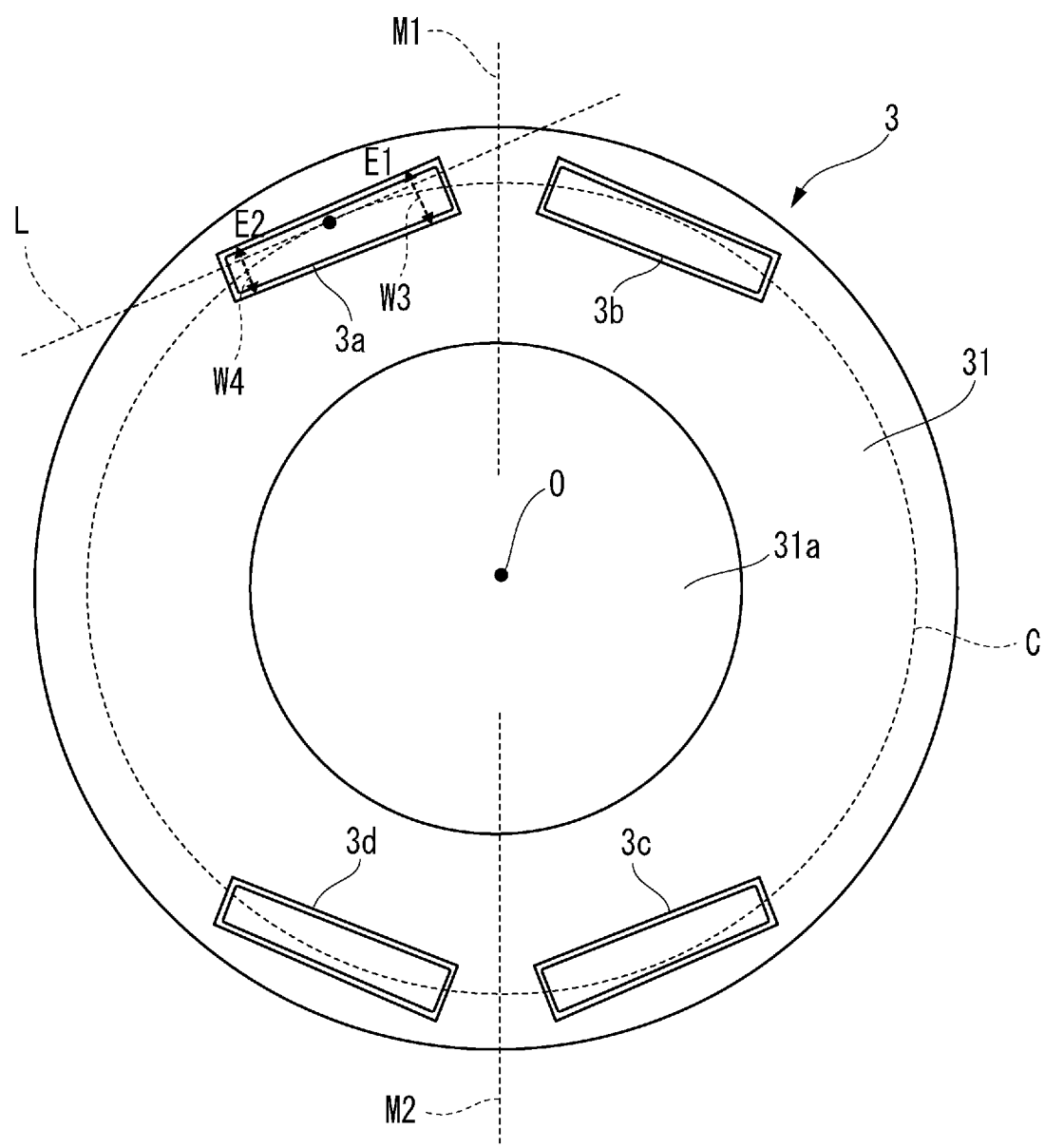
FIG. 21 is a horizontal cross-sectional view of the rotor of the interior permanent magnet synchronous motor according to a modification of the second embodiment.

FIG. 21 is a horizontal cross-sectional view of the rotor 3 of the interior permanent magnet synchronous motor 100 according to a modification of the second embodiment.

As illustrated in FIG. 21, the rotor 3 includes four rotor magnets 3a to 3d in the rotor core 31. The rotor magnets 3a and 3b configure one pole. Moreover, the rotor magnets 3c and 3d configure one pole. The polarities of these poles are different from each other.

Each of the rotor magnets 3a and 3b includes one end portion E1 that is close to the magnet center M1, and the other end portion E2 that is far from the magnet center M1. Moreover, in terms of the rotor magnets 3a and 3b, a radial width W4 at the other end portion E2 is smaller than a radial width W3 at the one end portion E1. Hence, the magnetomotive force for the stator coil 22 is weaker at the other end portion E2 far from the magnet center M1 than at the one end portion E1 close to the magnet center M1.

Similarly, also in terms of the rotor magnets 3c and 3d, the radial width W4 at the other end portion E2 is smaller than the radial width W3 at the one end portion E1. Hence, the magnetomotive force for the stator coil 22 is the strongest at the one end portion E1 close to the magnet center M2, and is weaker at the other end portion E2 far from the magnet center M2 than at the one end portion E1 close to the magnet center M2.

Up to this point the embodiments have been described. However, it is needless to say that the technical scope of the embodiments should not be construed in a limited manner by these embodiments that have been described. The embodiments that have been described are mere examples. Those skilled in the art understand that the embodiments that have been described can be modified in various manners within the technical scope described in the claims. The technical scope of the embodiments should be determined on the basis of the technical scope described in the claims and the scope of equivalents thereof.

What is claimed is:

1. A rotor of an interior permanent magnet synchronous motor,
comprising a plurality of poles, each of the plurality of poles having a pole center in a circumferential direction of the rotor,
wherein each of the plurality of poles includes a plurality of discrete magnets arranged spaced apart in the circumferential direction of the rotor, and the plurality of magnets is provided in such a manner that a magnetomotive force resulting from each magnet becomes weaker with increasing distance from the pole center.

2. The rotor according to claim 1, wherein the plurality of magnets is arranged in such a manner as to be displaced radially inward toward a rotation center as the plurality of magnets is farther away from the magnet center.

3. The rotor according to claim 2, wherein an outer peripheral side of an end portion, which is far from the magnet center, of the farthest magnet from the magnet center is provided with a flux barrier extending radially.

4. The rotor according to claim 1, wherein dimensions of the plurality of magnets are reduced with increasing distance from the magnet center.

5. The rotor according to claim 1, wherein a largest angle of angles formed by an imaginary line extending radially from a rotation center through a center point of each of the plurality of magnets, and a center line in a longitudinal direction of the each of the plurality of magnets increases with increasing distance from the magnet center.

6. The rotor according to claim 5, wherein an outer peripheral side of an end portion, which is far from the magnet center, of the farthest magnet from the magnet center is provided with a flux barrier extending radially.

7. The rotor according to claim 1, wherein
each pole of the rotor includes an even number of magnets,
each of two magnets closest to the magnet center includes one end portion close to the magnet center, and another end portion far from the magnet center, and
a radial dimension from a rotation center to the other end portion is smaller than a radial dimension from the rotation center to the one end portion.

8. The rotor according to claim 1, comprising an even number of magnets per pole,
wherein each of two magnets closest to the magnet center includes one end portion close to the magnet center, and another end portion far from the magnet center, and
a dimension at the other end portion is smaller than a dimension at the one end portion.

9. The rotor according to claim 1, wherein the magnets are provided which include a material or composition having a weaker magnetic force with increasing distance from the magnet center.

* * * * *